(No Model.)
H. A. MEYER.
LATHE ATTACHMENT.
No. 516,989. Patented Mar. 20, 1894.
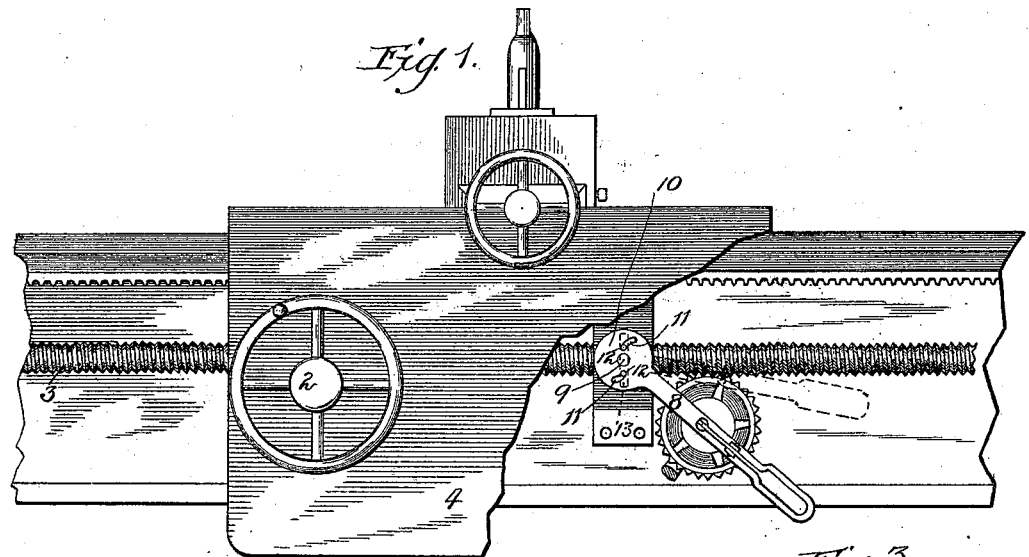
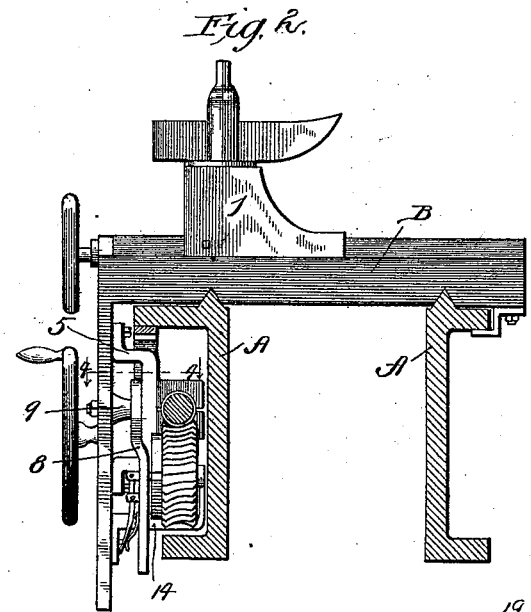
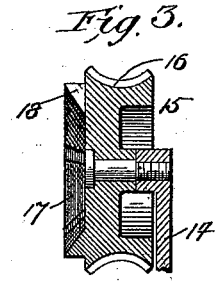
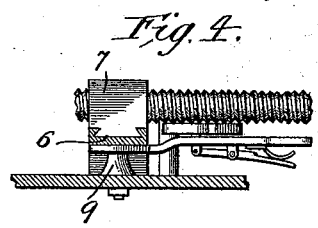
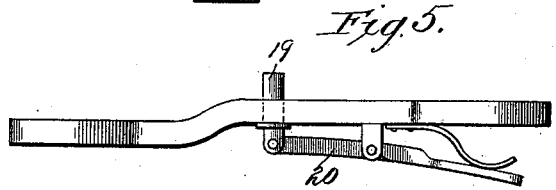

UNITED STATES PATENT OFFICE.

HERMAN A. MEYER, OF CHICAGO, ILLINOIS.

LATHE ATTACHMENT.

SPECIFICATION forming part of Letters Patent No. 516,989, dated March 20, 1894.

Application filed January 9, 1893. Serial No. 457,860. (No model.)

*To all whom it may concern:*

Be it known that I, HERMAN A. MEYER, a citizen of the United States, residing at Chicago, in the county of Cook and State of Illinois, have invented certain new and useful Improvements in Lathe Attachments; and I do hereby declare the following to be a full, clear, and exact description of the invention, such as will enable others skilled in the art to which it appertains to make and use the same.

This invention relates to a novel construction in an attachment for lathes, and more particularly to devices located between the feed screw and carriage of a lathe for controlling the connection between the same.

The object of this invention is to provide devices for automatically controlling the movement of the lathe carriage so that in cutting screw threads the tool carried by the carriage will take into and cut in the same score or cut when the carriage is run back to make another or deeper cut.

The invention consists in the features of construction and combinations of parts hereinafter fully described and specifically claimed.

In the accompanying drawings illustrating my invention,—Figure 1 is a front elevation of a portion of a lathe bed and carriage, with apron partially broken away for convenience of illustration. Fig. 2 is a cross sectional view of the same. Fig. 3 is a detail view in section of the regulating wheel. Fig. 4 is a detail fragmentary sectional view on the line 4—4 of Fig. 2. Fig. 5 is a detail side elevation of the operating lever taken on an enlarged scale.

Referring now to said drawings, A indicates the bed of a lathe and B the carriage mounted thereon carrying the tool holder 1 and provided in a familiar manner with a handwheel 2, by means of which the carriage can be moved back and forth independently of the fed screw 3, which latter is employed to give the regular forward feed to the carriage. The said carriage is provided with the usual apron 4, to the rear face of which is secured a guide bracket 5 in the dovetailed guide 6 of which are located the sections of a split nut 7 that are adapted to engage the feed screw 3 to impart motion to the carriage.

The said sections of the split nut 7 are controlled by an operating lever 8 that is pivoted to the front face of the guide bracket 5, as shown at 9, which pivot is located about opposite the center of the feed screw 3. This pivoted end of the operating lever 8 is provided with a head 10 having two cam slots 11 that receive pins 12 on the rear faces of the sections of the split nut and which pass through an upright slot 13 in the guide bracket 5. It will thus be seen that by reason of the connection between the head 10 of the operating lever and the sections of the split nut, that when said lever is swung upon its pivot the said sections of the split nut will be thrown into or out of engagement with the feed screw so that the carriage will be moved thereby or allowed to remain at rest. In the instance illustrated in Fig. 1, the operating lever is shown as depressed in full lines, and when in this position the sections of the split nut will engage the feed screw, while when the operating lever is in the position shown in dotted lines the split nut will be out of engagement with the feed screw.

It will be noted, of course, that in cutting a thread the carriage moves forward with the tool and when the length of the thread has been reached the tool is first retracted from the work and the carriage moved back to the other end of the thread. To accomplish this in a machine of this construction the operating lever 8 is thrown upwardly to the position shown in dotted lines in Fig. 1 as soon as the tool is retracted from the work, which has the effect of disconnecting the carriage from the feed screw, whereupon said carriage will remain at rest. The hand wheel 2 is then manipulated to run the carriage back to its starting point, whereat the automatic devices for starting the carriage so that the tool will take into the cut come into play. These devices are constructed as follows: Mounted upon bearings on a bracket 14 secured to the rear face of the apron 4 is a regulating wheel 15 comprising a worm-wheel 16 and a regulating or notched flange 17. The said worm-wheel 16 is located in position to be engaged by the feed screw 3 as shown in drawings, Figs. 1 and 2, while the notched flange 17 stands to one side of said feed screw, as shown in Figs. 2 and 4. The flange 17 is provided with a plurality of notches 18 which are radially arranged and extend through said flanges, while they are disposed about the flange in such manner that an equal number of teeth are located between each notch. For instance, in the example illustrated the worm-wheel 16 is provided with thirty teeth and there are five notches so that six teeth are located between each notch. This is the case when the pitch of the threads of the feed screw is such that there are six threads to the inch. The operating lever carries a detent 19 and is located between its ends and adjacent to the regulating wheel 15. Said detent 19 projects through an opening in the sides of the lever 8 and is controlled by a handle 20 pivoted to the operating lever and to the end of said detent and having a spring pressing on the under side of its free end to hold the detent normally at the inward limit of its movement. The parts are so located with relation to each other that when said detent is thus held at the inward limit of its movement, its inner end stands adjacent the flat face of the worm-wheel upon which the flange 17 is located, or even with the inner wall of the slots 18. The outer edge or periphery of the flange 17 is abrupt or at right angles to the flat face of the worm-wheel, while the inner face of said flange is beveled or inclined, as clearly shown in Fig. 3.

The operation of my invention is as follows: We will take, for instance, that the carriage is moving forward in making the first cut of the thread, whereupon the parts will be in the position shown in full lines in Figs. 1 and 2. When the end of the thread is reached the tool is first retracted and then the lever 8 is swung upwardly to the position shown in dotted lines in Fig. 1, which retracts the sections of the split nut from the feed screw. It will be noted that when the lever is moved upwardly the detent 19 will ride over the inclined face of the flange 17 in an obvious manner. The hand-wheel 2 is then manipulated to move the carriage back to its starting point, or to bring the cutting tool back to the front end of the cut that it is making. When the carriage is then brought to a standstill it will be seen that the regulating wheel 15 will be rotated by reason of its worm-wheel intermeshing with the threads of the feed screw 3. The cutting tool is then moved inwardly to the desired position, and thereupon the lever 8 is pressed downwardly. In pressing the lever downwardly it will be noted that the detent 19 will be forced against the abrupt face of the flange 17 and it will remain in this position until one of the notches 18 in said flange arrives opposite the detent, whereupon the pressure on the lever will permit it to descend with its detent passing through said notch to the position shown in full lines in Fig. 1, and this throws the split nut 17 into engagement with the feed screw to move the carriage forward. In this way it will be seen that by reason of the interrelation of the feed screw, the teeth of the worm-wheel and the notches of the regulating flange, the carriage will always start on its forward feed at such a time as to bring its cutting tool into the cut formerly made by it. For instance, when the pressure is first put upon the lever 8, if the carriage is ready to start at that moment one of the notches 18 will be located opposite the detent, and if it requires another or partial revolution of the work before it is intended that the carriage shall start, the next notch of the flange will arrive opposite the detent after a sufficient lapse of time, as will be plainly obvious.

From the foregoing description it will be seen that it is unnecessary to reverse the motion of the feed screw in returning the carriage to its starting point, but on the contrary all that is necessary is to throw the operating lever up, run the carriage back and then throw the operating lever down again, as has been explained, which will automatically start the carriage at the proper moment.

I claim as my invention—

1. The combination substantially as hereinbefore set forth in a lathe, of a carriage, a feed screw, an operating lever mounted upon said carriage and controlling the connections between the carriage and feed screw and having a projection, and a revoluble regulating wheel mounted upon the carriage, geared to said feed screw, located in the path of said projection on the operating lever, and having a plurality of passes for said projection, substantially as described.

2. The combination substantially as hereinbefore set forth in a lathe, of a carriage, a feed screw, an operating lever mounted upon the carriage and controlling the connections between the carriage and feed screw and having a projection, and a revoluble regulating wheel mounted upon the carriage and embracing a worm wheel geared to said feed screw and a notched regulating flange located in the path of said projection on the operating lever, substantially as described.

3. The combination substantially as hereinbefore set forth in a lathe, of a carriage, a feed screw, an operating lever mounted upon the carriage and controlling the connections between the carriage and feed screw and having a projection, and a revoluble regulating wheel mounted upon the carriage and embracing a worm wheel geared to the feed screw and a regulating notched flange located in the path of said projection, said flange having an abrupt outer edge, substantially as described.

4. The combination substantially as hereinbefore set forth in a lathe, of a carriage, a feed screw, an operating lever mounted upon the carriage and controlling the connections between the carriage and feed screw and having a movable projection or detent, and a revoluble regulating wheel mounted upon the carriage and embracing a worm wheel geared to the feed screw and a notched regulating flange located in the path of said projection or detent, said flange having an abrupt outer edge and an inclined or beveled inner edge, substantially as described.

In testimony whereof I affix my signature in presence of two witnesses.

HERMAN A. MEYER.

Witnesses:
 HARRY COBB KENNEDY,
 RUDOLPH W. LOTZ.